(No Model.)
W. ECKERT.
CHECK HOOK.
No. 495,627. Patented Apr. 18, 1893.
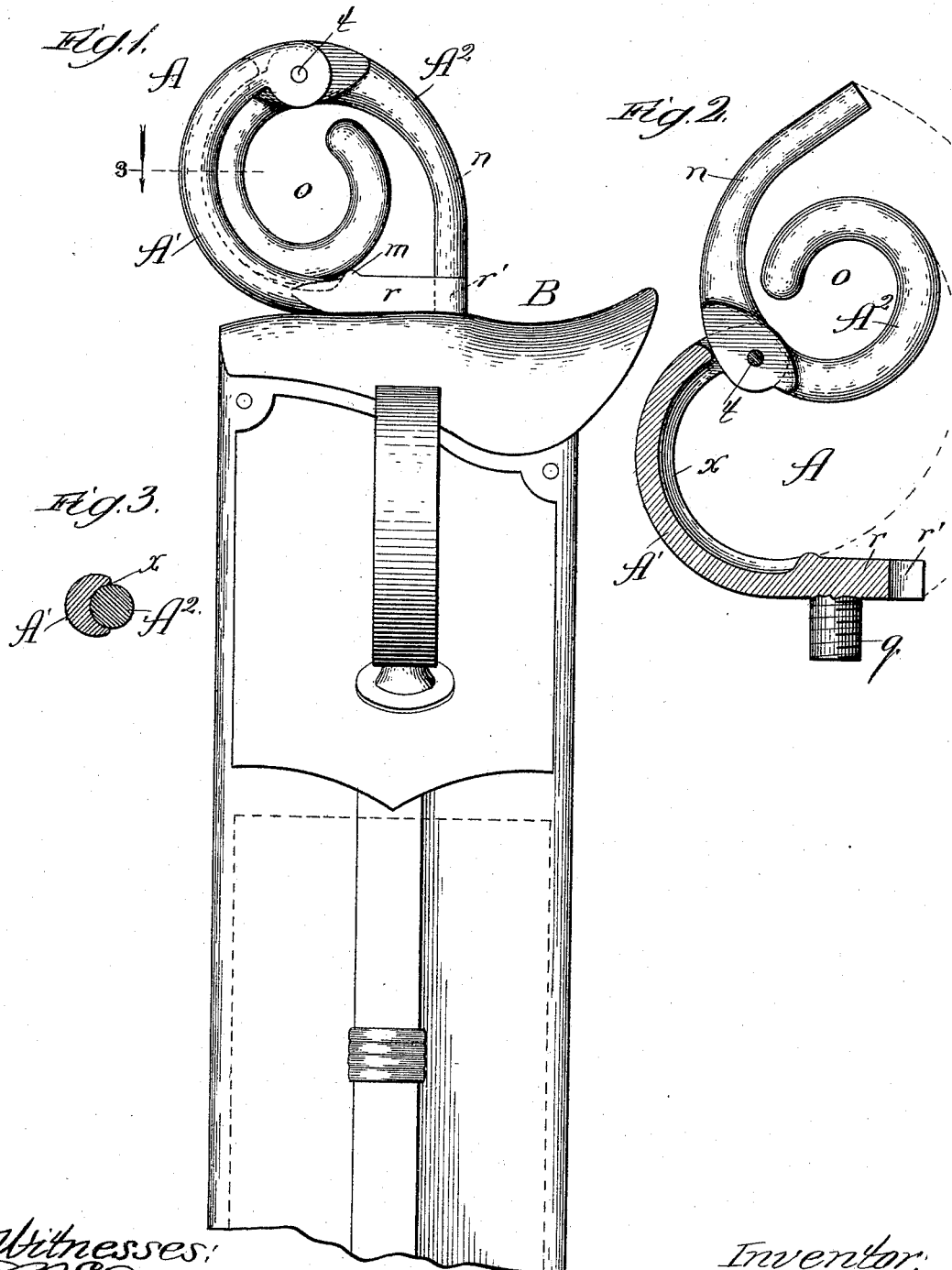
Witnesses:
Inventor:
Wesley Eckert.
By Dyrenforth & Dyrenforth
Attys.

UNITED STATES PATENT OFFICE.

WESLEY ECKERT, OF ELK POINT, SOUTH DAKOTA, ASSIGNOR OF ONE-HALF TO CHARLES H. FREEMAN, OF SAME PLACE.

CHECK-HOOK.

SPECIFICATION forming part of Letters Patent No. 495,627, dated April 18, 1893.

Application filed November 8, 1892. Serial No. 451,325. (No model.)

*To all whom it may concern:*

Be it known that I, WESLEY ECKERT, a citizen of the United States, residing at Elk Point, in the county of Union and State of South Dakota, have invented a new and useful Improvement in Check-Hooks, of which the following is a specification.

My invention relates to an improvement in the hook employed in harness for fastening the check-rein. As check hooks are commonly formed, there is liability of parts of the harness on one horse in a team being caught, in the customary movements of that horse's head, (especially when the animal is standing) in the check-hook on the other horse. This occurrence is not uncommon, and tends to frighten the team and cause runaway accidents.

The objects of my improvement are to provide a construction of check-hook whereby the liability referred to shall be avoided which shall render it a safety-hook in the sense of effectually guarding against separation from it of the check-rein, and which shall moreover afford a unique and attractive appearance.

In the accompanying drawings, Figure 1 shows my improved check-hook in side elevation applied to the saddle-portion of a harness. Fig. 2 is a view of the same in side elevation, partly sectional, showing the hook opened for the adjustment upon it of the check-rein; and Fig. 3 is a section taken at the line 3 on Fig. 1 and viewed in the direction of the arrow.

A is a check-hook, the construction of which comprises, essentially, two co-operating pivotally connected hooks A' and A². The hook A' is in the form of a curved finger presenting its convex side forward (with relation to the horse's head in position on the harness) and terminating, by preference, at its lower end in a flat or straight elongated base $r$, which may be provided with a threaded tongue $q$ to enter a corresponding socket (not shown) in the part of the harness (as the saddle B) to which the hook is secured. For a purpose hereinafter explained, the inner concave side of the finger A' should be grooved longitudinally, as shown at $x$; and a socket $r'$ may be provided in the rear end of the base $r$.

To the hook A' is pivoted the hook A² in the form approximating a spiral pivoted at a desired point between its extremities, as at $t$, between the sides of the bifurcated end of the hook A'. The spiral need form but the one ring $o$; and the overlapping end or leg $n$ is straight toward its extremity which reaches, when the co-operating parts of the hook A are closed, to and bears in the socket $r'$, in which position the front side of the ring portion $o$ fits and finds good bearing against the concave inner surface of the part A'; and in reaching that position by being turned on its pivot the ring of the spiral strikes a slight protuberance $m$ on the base $r$, but being somewhat resilient, passes it and becomes to such an extent locked as to prevent it from being shaken open or reversed on its pivot, though it may be readily opened by hand. As will be observed, the form of the leg $n$ causes it to incline along its outer or rear surface somewhat upward and forward, so that were any part of the harness of one horse in a team to become engaged with the device A on the other horse, by slipping over it, the pulling which the caught animal would exert to free itself would easily slide the engaged part over and separate it from the check-hook.

To adjust the check-rein in the hook A the spiral A² is raised on its pivot to the position illustrated in Fig. 2 and the rein is passed into the ring $o$. On reaching a point in the ring of the spiral below its pivot, the forward strain exerted by the animal on the check-rein will turn the spiral down to its closed position represented in Fig. 1, wherein the natural draft on the rein will tend to keep the spiral-hook A² closed, thus affording one safeguard against loosening of the rein, while the inner end-portion of the spiral obstructs the rein from slipping out at the back of the device.

What I claim as new, and desire to secure by Letters Patent, is—

1. A check-hook formed with a curved hook-portion A' on a base $r$, and a spiral hook-portion A² pivoted between its extremities to the upper end of the hook-portion A' and having the part forming the back of the check-hook, when closed, inclined in an upward and forward direction from the base and presenting therefrom an unobstructed continuous surface over the hook, substantially as and for the purpose set forth.

2. A check-hook A comprising, in combination, a curved hook-portion A' grooved on its inner side and provided with a flat base r terminating in a socket r' at one end, and having a tongue q and protuberance m, and a spiral hook-portion A², pivoted, as at t, to the upper end of the hook-portion A' and having the overlapping leg n straight toward its end and extending to the socket r' when the device is closed, substantially as and for the purpose set forth.

WESLEY ECKERT.

In presence of—
 M. J. FROST,
 W. N. WILLIAMS.